United States Patent [19]

Esposito

[11] 4,413,417
[45] Nov. 8, 1983

[54] ADJUSTABLE ANGLE PLATE

[76] Inventor: Joseph R. Esposito, 304 Greenway Ave., Syracuse, N.Y. 13206

[21] Appl. No.: 363,157

[22] Filed: Mar. 29, 1982

[51] Int. Cl.³ .............................................. G01B 5/24
[52] U.S. Cl. .................................. 33/174 M; 33/162
[58] Field of Search ............... 33/162, 174 M, 174 Q, 33/475

[56] References Cited

U.S. PATENT DOCUMENTS

| | | | |
|---|---|---|---|
| 2,126,896 | 8/1938 | Koller | 33/174 M |
| 2,487,844 | 11/1949 | Bigham | 33/174 M |
| 3,688,412 | 9/1972 | Keener | 33/174 M |
| 3,820,247 | 6/1974 | Casey et al. | 33/162 |
| 4,096,634 | 6/1978 | Gudel | 33/174 M |
| 4,168,574 | 9/1979 | Chase | 33/162 |

FOREIGN PATENT DOCUMENTS

| | | | |
|---|---|---|---|
| 2221446 | 11/1972 | Fed. Rep. of Germany | 33/162 |
| 3014200 | 11/1980 | Fed. Rep. of Germany | 33/475 |

OTHER PUBLICATIONS

Campbell, "Squaring Gage Indicates Incline from Vertical with Dial Readings", *American Machinist*, Mar. 25, 1948, p. 121.

*Primary Examiner*—Richard R. Stearns
*Attorney, Agent, or Firm*—Bruns & Jenney

[57] ABSTRACT

An adjustable toolmaker's square that includes a one piece body having a pair of legs containing flat accurately machined reference surfaces that meet at an angle that is slightly less than 90° to form a corner. One of the legs forms the base of the device and has a laterally extended groove formed therein in which a slide is movably received. The slide has a bearing surface that can be raised and lowered in regard to the base reference surface whereby the square is pivoted about the corner when it is resting upon a surface plate or the like whereby the other reference surface can be accurately positioned against a workpiece or the like.

9 Claims, 5 Drawing Figures

U.S. Patent  Nov. 8, 1983  Sheet 1 of 2  4,413,417
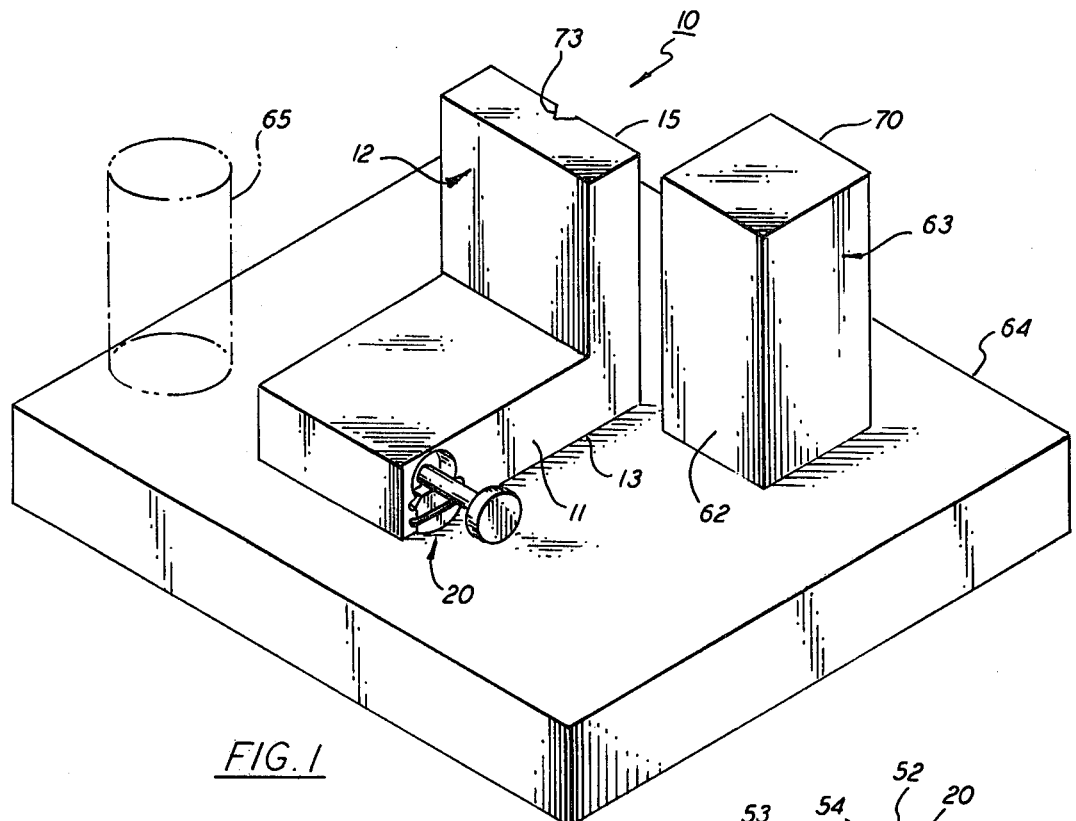
FIG. 1
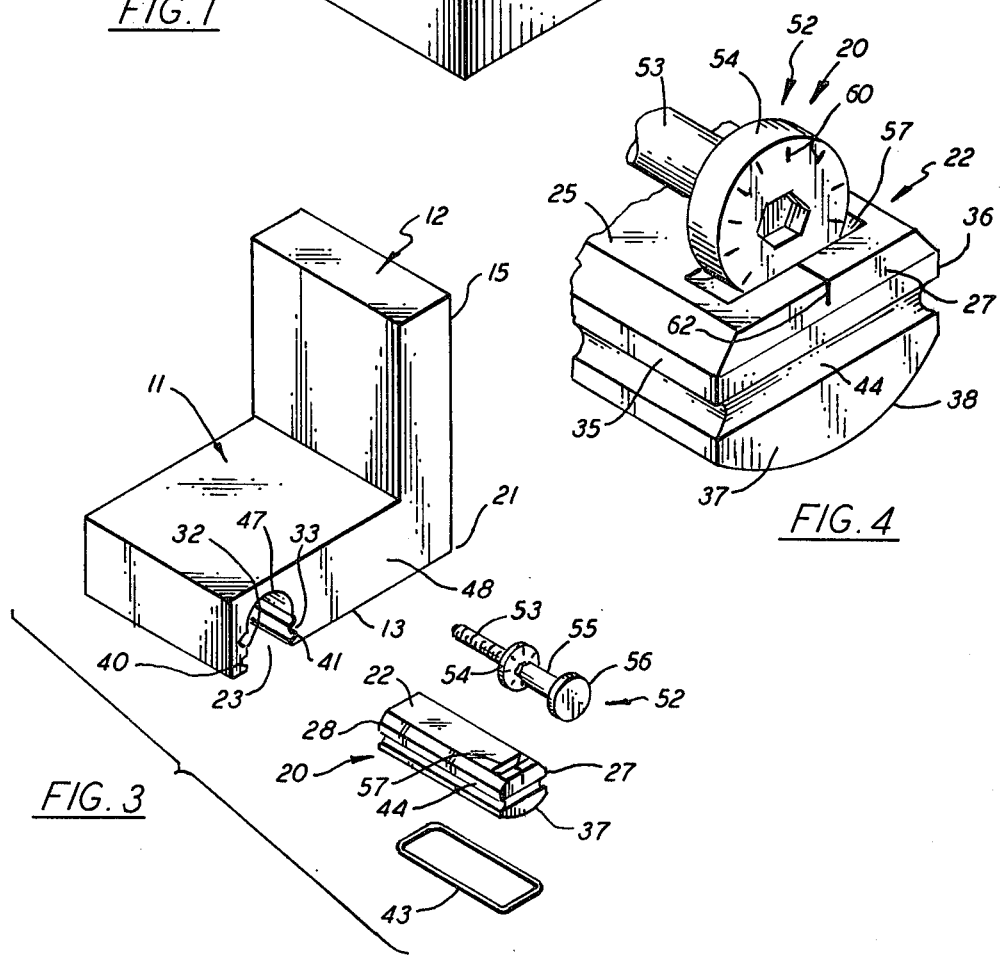
FIG. 3
FIG. 4

ADJUSTABLE ANGLE PLATE

BACKGROUND OF THE INVENTION

This invention relates to an improved toolmaker's square and in particular to an adjustable toolmaker's square that can be used equally as well as a checking tool or as a machining fixture.

The term toolmaker's square, as herein used, refers to an angle plate that is generally used in shop work by a pattern or toolmaker to check the squareness of a workpiece or the flatness of a surface. Typically the angle plate includes two fixed legs disposed at right angles to one another. The outer end faces of the two legs are accurately machined so that they form an exact 90° angle. In use, one face is seated on the lapped surface of a surface plate or the like and a piece to be checked, as for squareness, is brought against the opposite or upraised face of the plate. When the plate is applied to the work, any deviation from a true right angular relation can be observed by the passage of light between the two abutting surfaces. This light test does not tell the machinist or inspector the amount of deviation involved and shims, feeler gauges or the like must generally be employed to determine the amount or degree of error that is involved. This method of testing and measuring is, of course, time consuming and inconvenient.

In previous attempts to overcome the disadvantages associated with a fixed angle plate, various kinds of direct reading devices have been developed that generally employ an upraised leg or blade that is pivotably connected to a more stable base leg. An indicator is usually connected between the two legs which provide a readable measurement of the relative position of the two legs. However, because of the mechanical connection between the two legs, these devices are generally subject to wear with usage and of being damaged in the event it is dropped or struck by a heavy object. Accordingly, the accuracy of the instrument becomes seriously impaired. Furthermore, the use of a large number of different moving parts and connections necessitates greater skill and care on the part of the user, increases the cost of manufacture and provides greater room for error.

SUMMARY OF THE INVENTION

It is therefore an object of the present invention to improve squares used by toolmakers and the like.

A further object of the present invention is to provide an adustable tookmaker's square that contains two fixed legs.

A still further object of the present invention is to simplify the construction of an adjustable toolmaker's square.

Another object of the present invention is to provide a tookmaker's square that is efficient and practical in use and at the same time rugged and durable.

These and other objects of the present invention are attained by means of a toolmaker's square that includes a one piece body having a pair of legs containing outer reference surfaces thereon that meet to form a corner having an included angle that is slightly less than 90°. A slide is movably mounted in a groove contained in the leg that forms the base of the square. The slide has an arcuate shaped seat that can be raised and lowered in regard to the base reference surface whereby the square can be pivoted about the corner to accurately position the second upraised reference surface.

BRIEF DESCRIPTION OF THE DRAWINGS

For a better understanding of the present invention reference is had to the following detailed description of the invention that is to be read in conjunction with the accompanying drawings, wherein:

FIG. 1 is a perspective view of a tookmaker's square embodying the teachings of the present invention showing the square seated upon a surface plate;

FIG. 3 is an exploded view in perspective of the instant tookmaker's square;

FIG. 4 is an enlarged partial perspective view illustrating one end of the adjusting slide.

DESCRIPTION OF THE INVENTION

Figure 5:
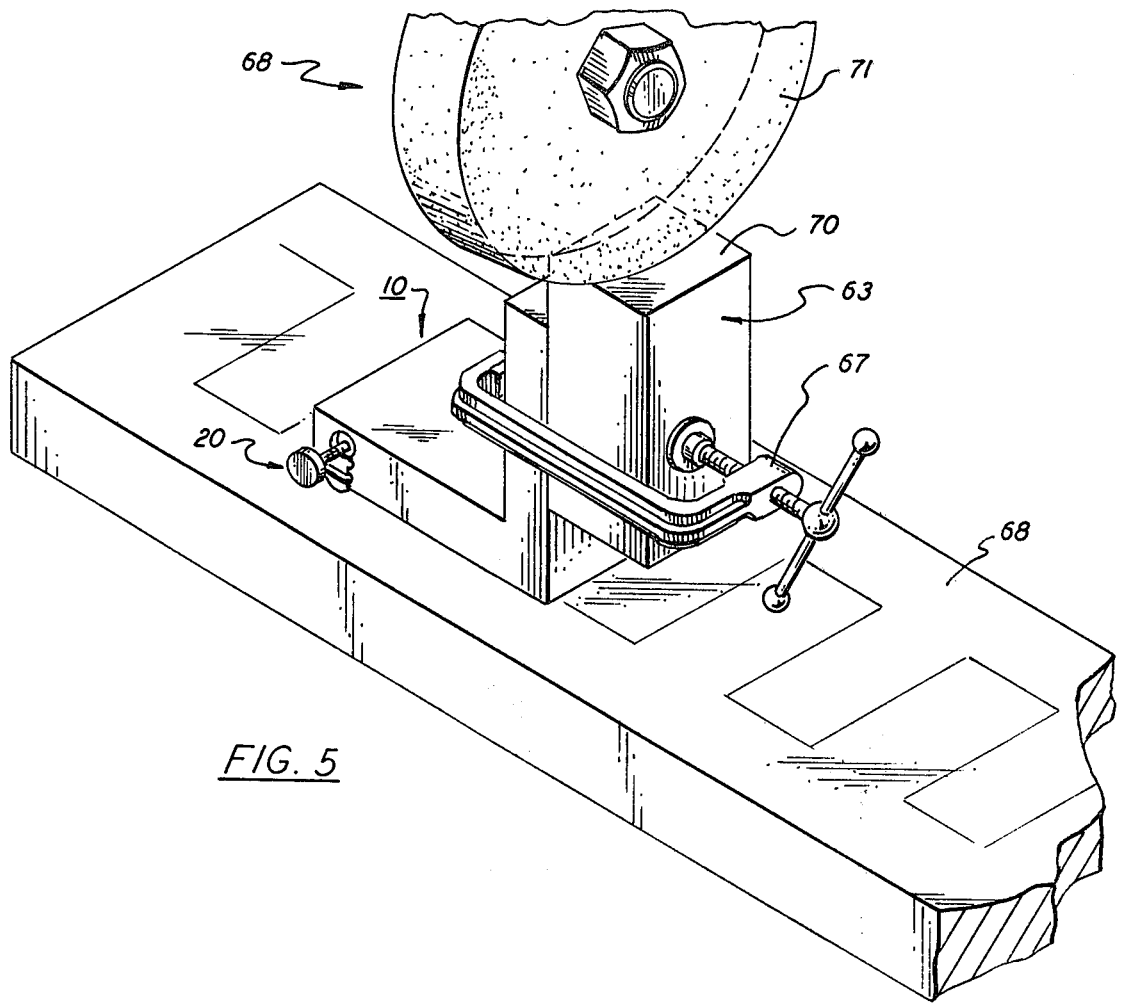
FIG. 5 is a perspective view showing the square of the present invention being employed as a holding fixture in a surface grinder.

With further reference to the drawings wherein like reference numbers are used to designate like parts, there is shown a tookmaker's square, generally referenced 10, that embodies the teachings of the present invention. The square is formed from a single piece of material, which is preferably tool steel, and includes a generally horizontal base leg 11 and a vertically extended gauge leg 12 that depends upwardly from the base leg. The bottom surface 13 of the base leg is accurately machined and lapped to provide an extremely flat reference surface. The outer surface 15 of the upraised gauge leg 12 is similarly machined and lapped to provide a second accurate reference surface 15 that forms a corner 21 with the first reference surface 13.

Normally, in a conventional toolmaker's square, the two reference surfaces form an included angle of 90° therebetween. In use the base leg is placed upon a horizontal worktable, such as a surface plate, and the now raised vertical reference surface is used as a gauge against which a workpiece can be visually compared. In the event the work is not square with the vertical reference surface, shims or similar devices are placed under the base in order to determine the degree or amount the work is out of square. This procedure, for the most part, has proven to be generally unsatisfactory in that it is complex, time consuming and oftentimes leads to errors being made.

In the apparatus of the present invention, the included angle between the two reference surfaces 13 and 15 is slightly less than 90°. Accordingly, when the base of the square is seated flat upon a surface plate, the vertical reference surface will be angularly displaced from the perpendicular some known amount. Although the included angle can be arbitrarily selected, for purposes of explanation it will be assumed that in the present embodiment it is 89°.

An adjustable slide assembly, generally referenced 20, is movably supported within the base leg of the square which can be laterally positioned to tilt or pivot the square about corner 21 formed by the intersection of the two reference surfaces. As a result, the angular positioning of the vertically extended reference surface 15 can be similarly adjusted. The control mechanism includes an elongated slide 22 that is adapted to be received within a laterally extended contoured slotted opening 23 that is cut into the base leg of the square. The top surface 25 of the slide is provided with a flat tapered surface that inclines uniformally from the high end 27 of the slide toward the low end 28. A complimentary tapered surface 30 is also accurately machined in the bottom of the slotted opening against which top surface 25 of the slide rides in assembly.

In assembly, the inclined top surface 25 of the slide moves laterally over the similarly inclined bottom surface 30 of the groove to vertically adjust the position of the slide in regard to the reference surface 13 machined on the base leg. The side walls 32 and 33 of the opening, which are perpendicular to the reference surface 13, provide a close sliding fit with the side walls 35 and 36 of the slide to insure that the slide will traverse a straight line of travel as it is moved laterally in the opening. The bottom section of the slide is generally arcuate shaped in cross section and is capable of protruding below the reference surface 13 to provide a one point rest surface 38 upon which, along with corner 21, the square stands when placed upon a flat support surface. As can be seen, when in this stance, the angular position of the slide can be very precisely adjusted by repositioning the slide in the opening.

A pair of semicircular grooves 40 and 41 are cut into the opposing side walls of the slotted opening. The grooves are also cut on an incline that parallels the taper formed in the top surface of the slide-receiving opening. As best seen in FIG. 3, a circular grommet 43 is supported about the entire periphery of the slide within a continuous groove 44 formed therein. In assembly, as the slide is operatively positioned within the opening the grommet slides within the grooves 40 and 41 to allow the slide to move laterally without falling through the opening.

Figure 2:
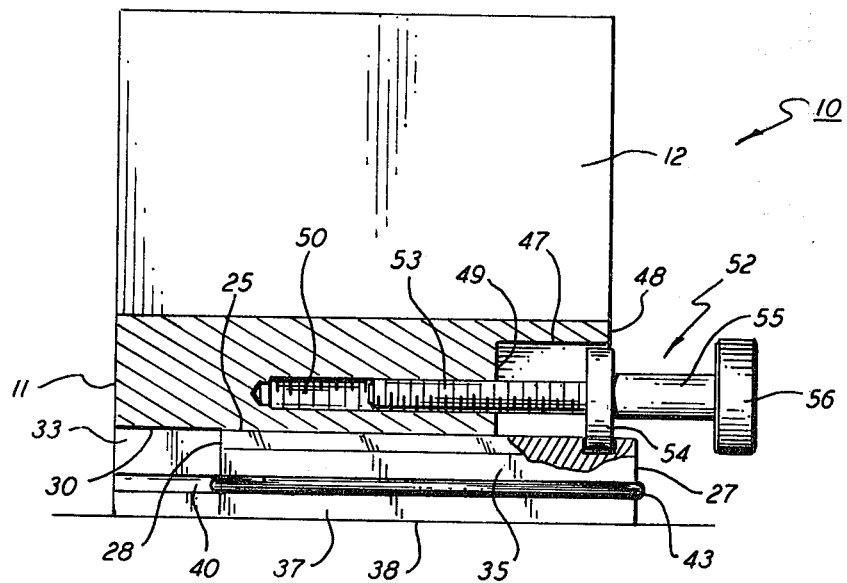
FIG. 2 is an enlarged end view of the toolmaker's square shown in FIG. 1 in partial section showing the adjusting slide mechanism contained within the base leg thereof.

Turning now to FIG. 2, an expanded counterbore 47 is passed into the base leg of the square through the front wall 48 thereof. The bore is aligned with the vertical axis of the slide receiving opening and is positioned directly over the opening so that the lower part of the bored hole penetrates into the slide receiving opening. The bore is machined into the base for a predetermined distance and ends in a blind vertical wall 49. A tapped hole 50 is passed inwardly through the blind wall with the hole being coaxially aligned along the centerline of the counterbore.

A drive mechanism 52 is operatively connected to the slide and is utilized to move the slide laterally within the slide opening. The mechanism includes a threaded shaft 53 that is turned into the tapped hole 50. The shaft is secured in one end face of a circular driver 54 and a coaxial shank 55 is similarly secured to the opposite face of the driver. A knurled annular knob 56 is affixed to the distal end of the shank which permits the drive mechanism to be turned in the base leg of the square.

The driver, in assembly, passes downwardly into a companion cleft 57 formed in the top surface of the slide. The cleft compliments the geometry of the driver and provides a close fit between the adjacent surfaces of the two members. As can be seen, as the drive mechanism is turned within the tapped hole, the slide is driven laterally within the receiving opening formed in the base. The rest surface 38 of the slide can thus be raised or lowered in regard to the base reference surface. The arcuate shape of the rest surface enables the slide to continually maintain line contact with the support surface as the square is tipped about the corner 21.

A circular index is scribed or otherwise provided upon the driver. The index contains a series of equally spaced radially extended lines 60 that are arranged to be aligned against a witness mark 62 similarly scribed of the top surface and the large end 27 of the slide comparison of the index line to the witness mark provides a visual indication as to the slide's position. In the present embodiment of the invention, moving the driver one index position, that is, rotating the driver from one index mark to the next adjacent mark will raise or lower the bearing surface four millionths of an inch. However, it should be clear to one skilled in the art that this incrementation can be varied by changing the incline of the tapered surfaces of the pitch of the screw thread.

As noted above, the present square can be used as either an inspection tool to determine the squareness of a workpiece or alternatively as a holding fixture to enable square surfaces to be accurately machined upon a workpiece. In the latter case, one flat surface will be machined on the work, as for example surface 62 on workpiece 63 shown in FIG. 1. The vertical reference surface on the square will be adjusted to a 90° position on the surface plate 64 using a precision ground cylindrical gauge block 65 as a reference. Adjustment is achieved by placing the reference surface 15 against the gauge block and moving the slide until no light can be seen between the abutting surfaces. The finished surface of the workpiece is then clamped against the surface 15 of the square using a C-clamp 67 or the like (as shown in FIG. 4). The base of the square is then positioned upon the table 68 of a machine tool, such as the surface grinder 69, having a magnetic chuck, and the top surface 70 of the work machined to a flat finish by wheel 71. As should now be evident, surfaces 70 and 62 are now square. This procedure can be repeated as required a number of times until all sides are square. A V-shaped notch 73 is vertically machined in the face of the working surface to permit cylindrical workpieces to be clamped to the square.

When used as a measuring or inspection tool, the square is again seated upon surface plate 64, and the rest surface of the slide is brought flush with the base reference surface. The reference surface 15 on the gauge leg 12 is then brought against a surface being inspected and the slide positioned to bring both surfaces into light tight contact. By noting the number of index lines that are brought past the witness mark, the amount that the base is displaced above the bearing surface can be quickly ascertained. By knowing the distance the bearing surface is from the pivot corner and the height of the workpiece, the amount that the surface is out of square can be easily determined using simple shop mathematics.

While this invention has been described with reference to the details as set forth above, it is not limited to the specific structure as disclosed and the invention is intended to cover any modifications or changes as may come within the scope of the following claims.

I claim:

1. A toolmaker's square that includes a single piece body having a pair of cojoined legs, each leg having an accurately machined flat outer reference surface thereon with the surfaces meeting to form a corner having an inside angle that is slightly less than 90°, one of said legs forming the base of the square and containing a laterally extended slotted opening passing upwardly through the reference surface with the bottom of the opening being a flat tapered surface, a slide movably supported in the opening that has a tapered top surface that rides in contact against the tapered bottom surface of the opening to raise and lower the lower section of the slide through the opening along a path of travel that is perpendicular to the reference surface of the base as the slide is moved laterally, said lower section of the slide containing a rest surface upon which the square can be seated and a drive means threaded into the base leg that is operatively connected to the slide for moving the slide laterally in said opening.

2. The square of claim 1 wherein the opposed side walls of the slide form a close running fit with the side walls of the opening.

3. The square of claim 2 wherein said side walls of the opening are perpendicular with the reference surface machined on said one leg.

4. The square of claim 3 wherein the side walls of the opening contain a continuous semicircular groove for receiving therein a grommet that is secured to the slide.

5. The square of claim 4 wherein the continuous groove contained in the side walls of the opening is parallel with the tapered top wall of said opening.

6. The square of claim 1 wherein said drive means further includes a threaded shaft that is received within a threaded hole formed in the base leg, a circular driver secured to the shaft that is rotatably received in a slot cut in said slide whereby the slide is caused to move with the shaft and a knurled head located upon the distal end of the shaft to permit the shaft to be turned in said base leg.

7. The square of claim 6 wherein the driver has a series of equally spaced index lines scribed about the periphery thereof and the slide has a witness mark scribed thereon against which the index lines are indexed.

8. The square of claim 1 wherein the rest surface of the slide is arcuate in form to provide line contact against a supporting surface upon which it is seated.

9. The square of claim 8 wherein the line of contact described by the rest surface is parallel to the corner formed by the two reference surfaces.

* * * * *